US011177916B2

(12) United States Patent
Kim et al.

(10) Patent No.: US 11,177,916 B2
(45) Date of Patent: Nov. 16, 2021

(54) METHOD FOR TRANSMITTING DM-RS-BASED DOWNLINK DATA SIGNAL IN MULTIPLE-ANTENNA-BASED WIRELESS COMMUNICATION SYSTEM AND DEVICE THEREFOR

(71) Applicant: LG Electronics Inc., Seoul (KR)

(72) Inventors: Hyungtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 16/476,683

(22) PCT Filed: Jan. 17, 2018

(86) PCT No.: PCT/KR2018/000801
§ 371 (c)(1),
(2) Date: Jul. 9, 2019

(87) PCT Pub. No.: WO2018/135855
PCT Pub. Date: Jul. 26, 2018

(65) Prior Publication Data
US 2019/0363849 A1 Nov. 28, 2019

Related U.S. Application Data

(60) Provisional application No. 62/447,338, filed on Jan. 17, 2017.

(51) Int. Cl.
*H04L 5/00* (2006.01)
*H04W 72/04* (2009.01)
*H04B 7/0456* (2017.01)

(52) U.S. Cl.
CPC ......... *H04L 5/0048* (2013.01); *H04B 7/0456* (2013.01); *H04W 72/04* (2013.01); *H04L 5/0023* (2013.01); *H04L 5/0051* (2013.01)

(58) Field of Classification Search
None
See application file for complete search history.

(56) References Cited

U.S. PATENT DOCUMENTS

| 6,396,881 B1 * | 5/2002 | White | H03D 1/2245 375/321 |
| 10,425,134 B2 * | 9/2019 | Perlman | H04L 1/0003 |

(Continued)

FOREIGN PATENT DOCUMENTS

| KR | 101582685 B1 | 1/2016 |
| KR | 1020160023668 A | 3/2016 |

*Primary Examiner* — Bunjob Jaroenchonwanit
(74) *Attorney, Agent, or Firm* — Dentons US LLP

(57) ABSTRACT

The present application proposes a method for receiving a demodulation-reference signal (DM-RS)-based downlink data signal from a base station by a terminal in a multiple-antenna-based wireless communication system. Specifically, the method comprises the steps of: receiving information relating to a linear coupling coefficient of a DM-RS antenna port from the base station; and receiving, from the base station, the downlink data signal to which a precoder for mapping the signal to a reference DM-RS antenna port and at least one auxiliary DM-RS antenna port among a plurality of DM-RS antenna ports is applied, wherein the precoder is to map the downlink data signal to the reference DM-RS antenna port and map the downlink data signal to the at least one auxiliary DM-RS antenna port by applying the linear coupling coefficient.

8 Claims, 11 Drawing Sheets

(56) References Cited

U.S. PATENT DOCUMENTS

| | | | |
|---|---|---|---|
| 10,886,979 B2* | 1/2021 | Forenza | H04L 25/03891 |
| 2012/0121031 A1* | 5/2012 | Tang | H04B 7/0691 |
| | | | 375/267 |
| 2012/0282936 A1* | 11/2012 | Gao | H04L 5/0053 |
| | | | 455/450 |
| 2013/0329543 A1 | 12/2013 | Ogawa et al. | |
| 2015/0139138 A1* | 5/2015 | Seo | H04B 7/024 |
| | | | 370/329 |
| 2015/0156670 A1* | 6/2015 | Jonsson | H04L 25/021 |
| | | | 455/502 |
| 2015/0163781 A1 | 6/2015 | Kim et al. | |
| 2016/0149680 A1* | 5/2016 | Kang | H04B 7/0639 |
| | | | 370/329 |
| 2016/0344460 A1 | 11/2016 | Frank et al. | |
| 2018/0167116 A1* | 6/2018 | Rahman | H04B 7/06 |
| 2019/0044592 A1* | 2/2019 | Kaleva | H04B 7/0421 |
| 2019/0140716 A1* | 5/2019 | Frank | H04B 7/0639 |
| 2020/0221450 A1* | 7/2020 | Harrison | H04L 5/0094 |

* cited by examiner (A) CONTROL-PLANE PROTOCOL STACK (B) USER-PLANE PROTOCOL STACK

METHOD FOR TRANSMITTING DM-RS-BASED DOWNLINK DATA SIGNAL IN MULTIPLE-ANTENNA-BASED WIRELESS COMMUNICATION SYSTEM AND DEVICE THEREFOR

This application is a National Stage Entry of International Application No. PCT/KR2018/000801 filed Jan. 17, 2018, which claims priority to U.S. Provisional Application No. 62/447,338 filed Jan. 17, 2017, all of which are incorporated herein by reference.

TECHNICAL FIELD

The present disclosure relates to a wireless communication system, and more particularly, a method of transmitting a demodulation-reference signal (DM-RS) based downlink data signal in a multi-antenna wireless communication system and device therefor.

BACKGROUND ART

As an example of a wireless communication system to which the present disclosure is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQuest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

Based on the above discussion, the present disclosure provides a method of transmitting a DM-RS based DL data signal in a multi-antenna wireless communication system and device therefor.

Technical Solution

In an aspect of the present disclosure, provided is a method of receiving demodulation-reference signal (DM-RS) based downlink data signal from a base station by a user equipment (UE) in a multi-antenna wireless communication system. The method may include: receiving information on a linear combination coefficient of a DM-RS antenna port from the base station; and receiving, from the base station, the downlink data signal to which a precoder for mapping to a reference DM-RS antenna port and at least one secondary DM-RS antenna port among a plurality of DM-RS antenna ports is applied. The precoder may be configured to map the downlink data signal to the reference DM-RS antenna port and map the downlink data signal to the at least one secondary DM-RS antenna port by applying the linear combination coefficient.

In another aspect of the present disclosure, provided is a user equipment (UE) in a wireless communication system. The UE may include: a wireless communication module; and a processor connected to the wireless communication module. The processor may be configured to receive information on a linear combination coefficient of a demodulation-reference signal (DM-RS) antenna port from a base station and receive a downlink data signal to which a precoder for mapping to a reference DM-RS antenna port and at least one secondary DM-RS antenna port among a plurality of DM-RS antenna ports is applied. The precoder is configured to map the downlink data signal to the reference DM-RS antenna port and map the downlink data signal to the at least one secondary DM-RS antenna port by applying the linear combination coefficient.

In this case, the linear combination coefficient may include a first factor for amplitude scaling with a value greater than or equal to 0 and less than 1 and a second factor for phase shifting. When there are two or more secondary DM-RS antenna ports, linear combination coefficients respectively corresponding to the two or more secondary DM-RS antenna ports may be configured independently from each other.

The downlink data signal may be composed of a first layer signal and a second layer signal, and a reference DM-RS antenna port and at least one second DM-RS antenna port to which the first layer signal is mapped may be different from a reference DM-RS antenna port and at least one secondary DM-RS antenna port to which the second layer signal is mapped.

The reference DM-RS antenna port may be changed such that it is cyclically repeated on a predetermined time-frequency resource unit basis.

Advantageous Effects

According to the present disclosure, a DM-RS based DL data signal can be efficiently transmitted and received in a multi-antenna wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

The configuration, operation and other features of the present disclosure will be understood by the embodiments of the present disclosure described with reference to the accompanying drawings. The following embodiments are examples of applying the technical features of the present disclosure to a 3rd Generation Partnership Project (3GPP) system.

Although the embodiments of the present disclosure will be described based on an LTE system and an LTE-advanced (LTE-A) system, the LTE system and the LTE-A system are purely exemplary and the embodiments of the present disclosure can be applied to any communication system corresponding to the aforementioned definition. In addition, although the embodiments of the present disclosure will herein be described based on Frequency Division Duplex (FDD) mode, the FDD mode is only exemplary and the embodiments of the present disclosure can easily be modified and applied to Half-FDD (H-FDD) mode or Time Division Duplex (TDD) mode.

In the present disclosure, a base station (eNB) may be used as a broad meaning including a remote radio head (RRH), an eNB, a transmission point (TP), a reception point (RP), a relay, etc.

Figure 1:
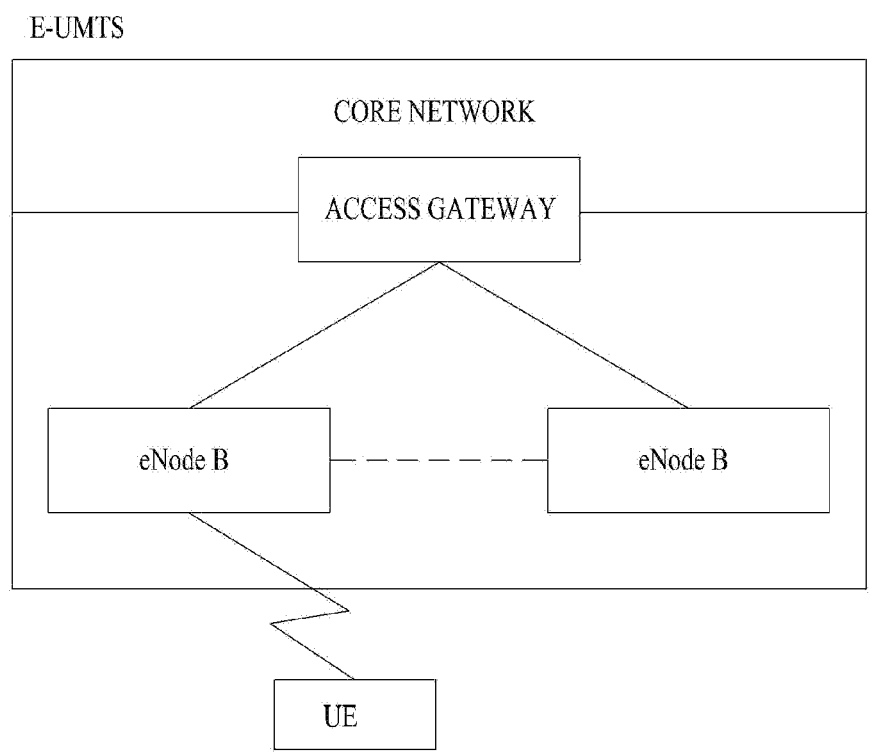
FIG. 1 is a diagram schematically illustrating a network structure of an evolved universal mobile telecommunications system (E-UMTS) as an exemplary radio communication system.
Figure 2:
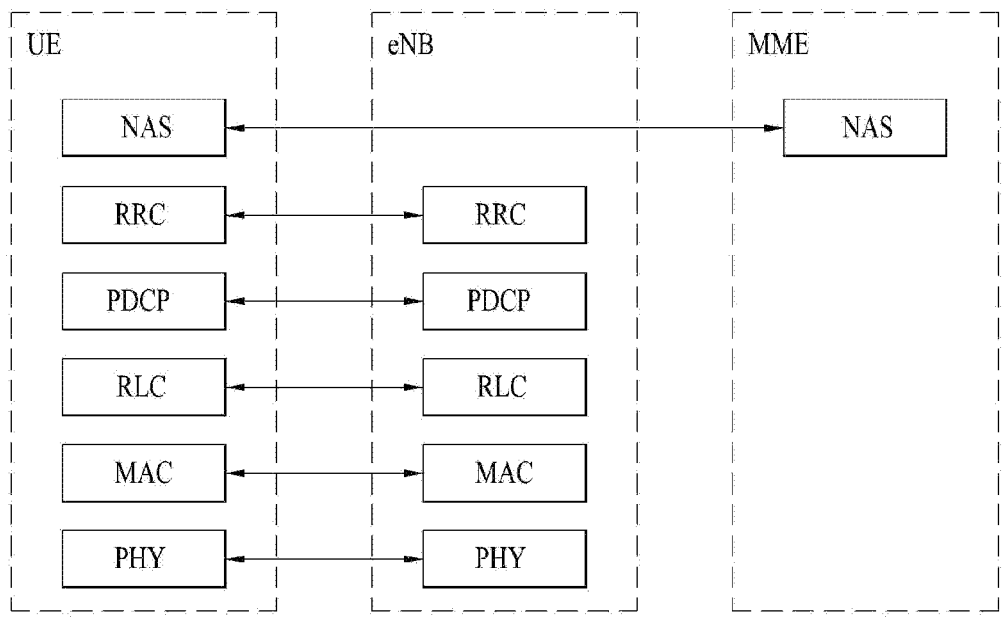
FIG. 2 is a diagram illustrating structures of a control plane and a user plane of a radio interface protocol between a UE and an evolved UMTS terrestrial radio access network (E-UTRAN) based on the 3GPP radio access network specification.
Figure 2:
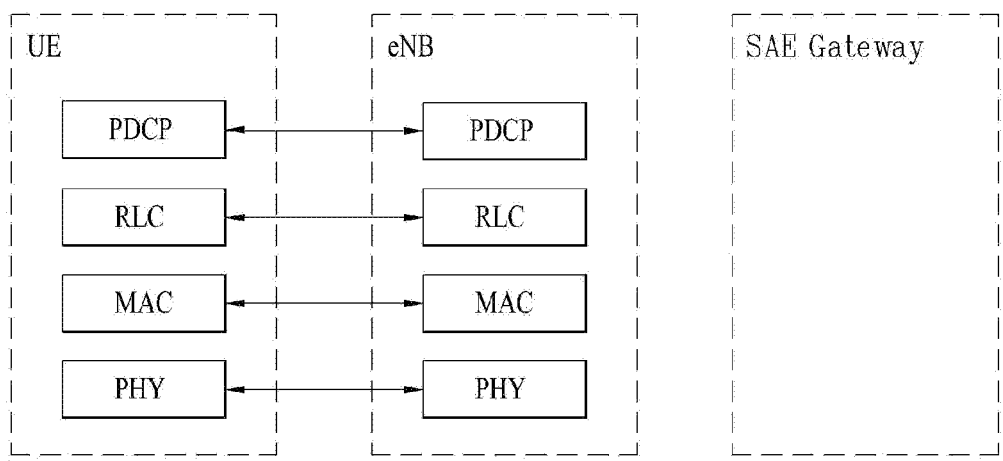

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
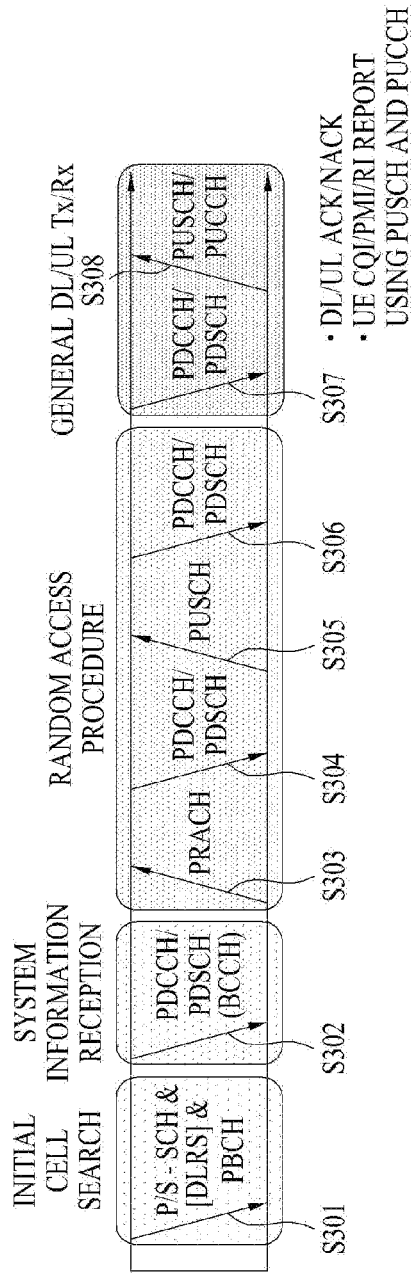
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
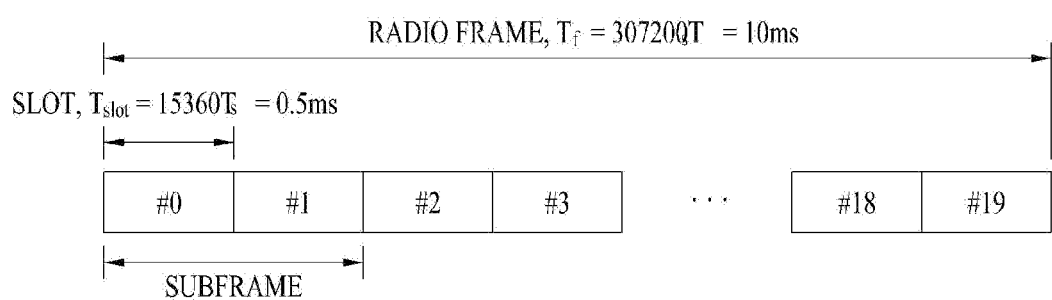
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz×2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
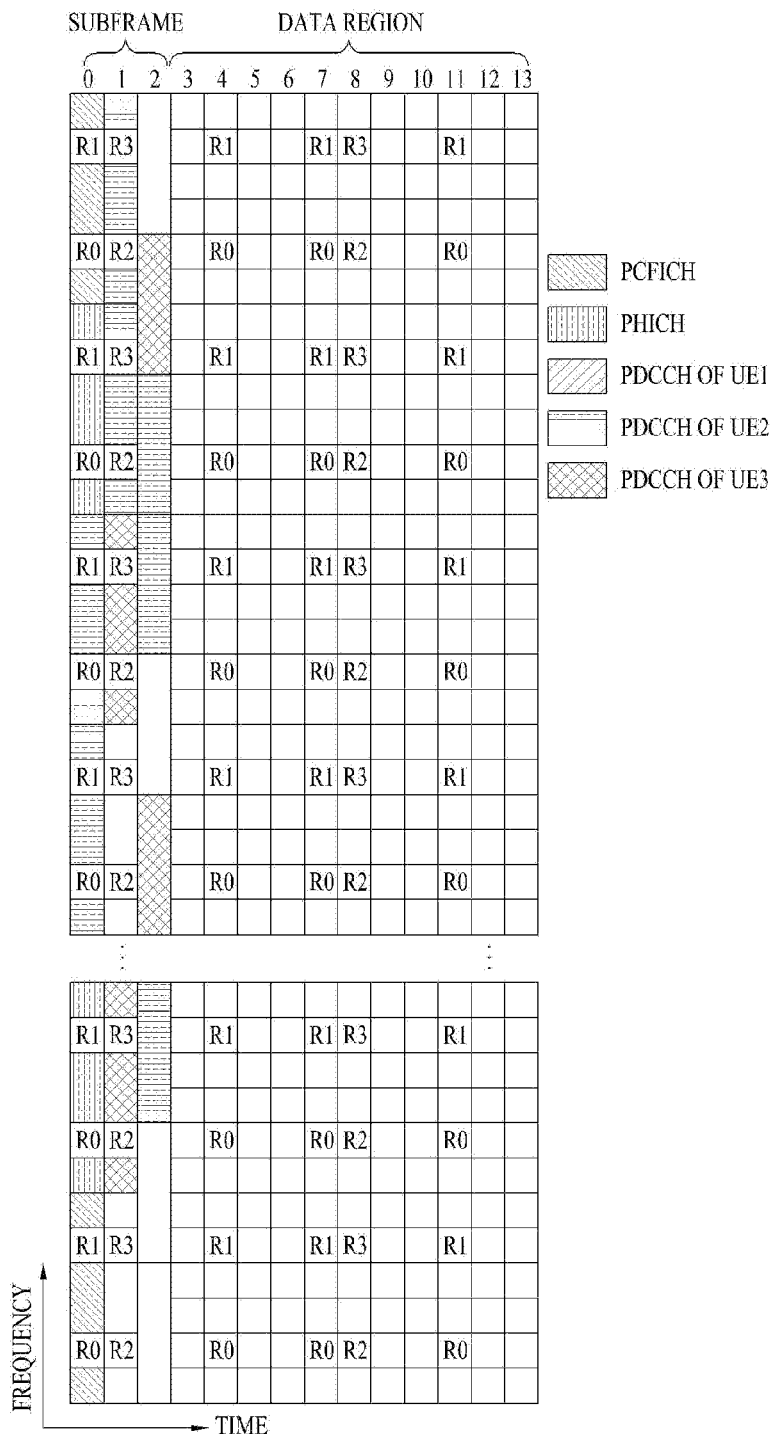
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
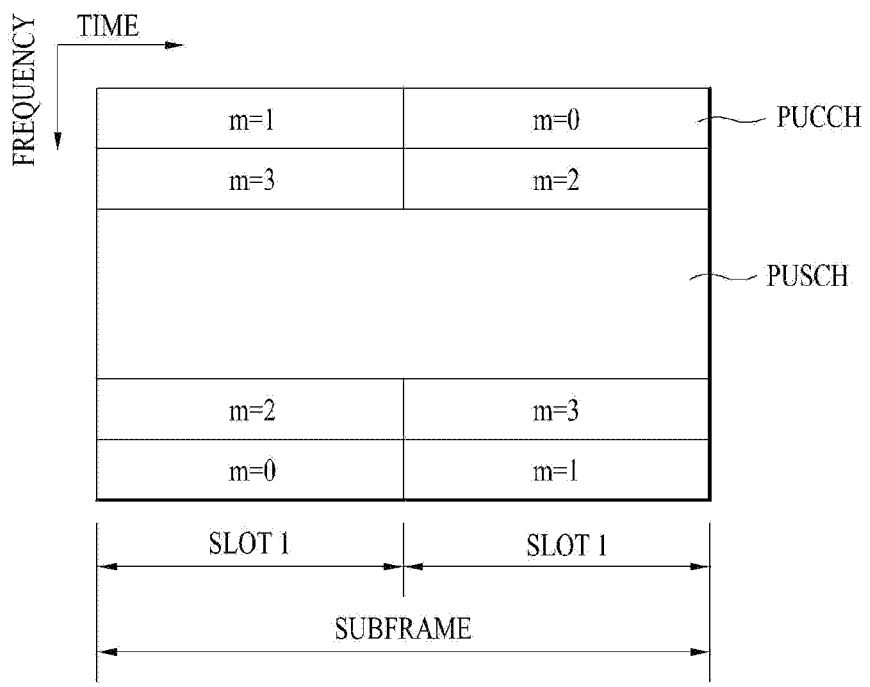
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a reference signal (RS) will be described.

In general, for channel measurement, an RS known to both transmitting and receiving ends is transmitted from the transmitting end to the receiving end together with data. The RS includes information on a modulation scheme as well as information for channel measurement to assist to perform a demodulation process. The RS is divided into: a dedicated RS (DRS) for a base station and a specific UE, i.e., a UE-specific RS; and a cell-specific RS (CRS) for all UEs in a cell, i.e., a common RS. In addition, the CRS includes an RS used by a UE to measure CQI/PMI/RI and report the same to a base station, which is referred to as a channel state information RS (CSI-RS).

Figure 7:
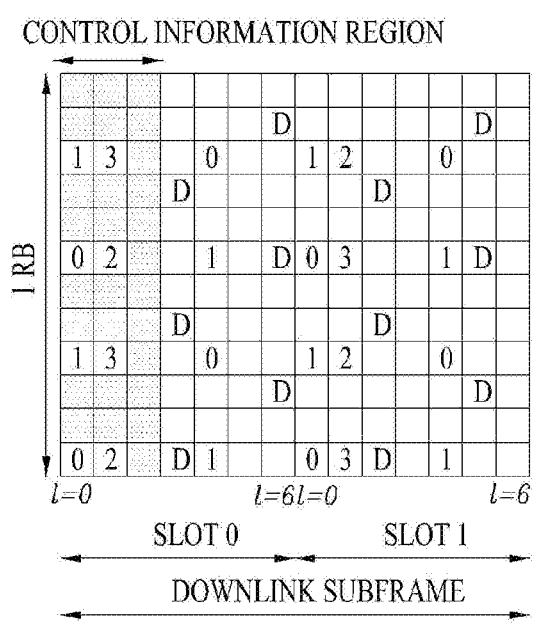
FIGS. 7 and 8 are diagrams illustrating the configurations of DL reference signals in an LTE system supporting DL transmission using 4 antennas.
Figure 8:
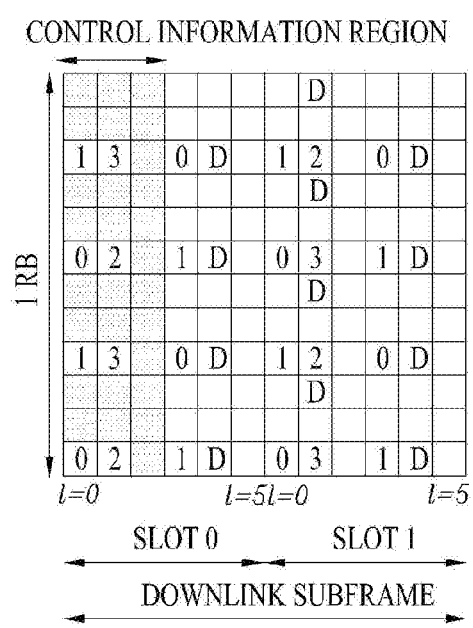

FIGS. 7 and 8 illustrate RS configurations in an LTE system supporting DL transmission using 4 antennas. Specifically, FIG. 7 illustrates an RS configuration in the case of a normal cyclic prefix (CP), and FIG. 8 illustrates an RS configuration in the case of an extended CP.

Referring to FIGS. 7 and 8, reference numerals 0 to 3 in grids denote cell-specific RSs, CRSs transmitted on antenna ports 0 to 3 for channel measurement and data modulation. The cell-specific RS, CRS may be transmitted to UEs in a control information region as well as a data information region.

In addition, reference character D in grids denotes a downlink demodulation RS (DM-RS) corresponding to a UE-specific RS. The DM-RS is transmitted in a data region, that is, on a PDSCH, and supports single-antenna port transmission. The presence or absence of a UE-specific RS, DM-RS is indicated to a UE by higher-layer signaling. In FIGS. 7 and 8, the DM-RS is transmitted on antenna port 5. In 3GPP TS 36.211, DM-RSs for a total of eight antenna ports, antenna ports 7 to 14 are defined.

Figure 9:
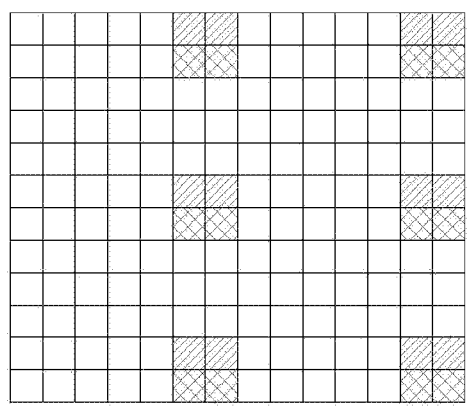
FIG. 9 is a diagram illustrating DL DM-RS allocation defined in the current 3GPP system.

FIG. 9 illustrates DL DM-RS allocation defined in the current 3GPP system. Specifically, FIG. 9 illustrates REs occupied by DM-RSs among REs in one RB pair of a normal DL subframe with the normal CP.

To support PDSCH transmission, a DM-RS is transmitted on an antenna port(s), i.e., antenna port p, where p=5, p=7, p=8, or p=7, 8, ..., ν+6 (where ν is the number of layers used for the PDSCH transmission). The DM-RS is present only when the PDSCH transmission is associated with the corresponding antenna port, and it is a valid reference for demodulating the PDSCH. The DM-RS is transmitted only on RBs to which the corresponding PDSCH is mapped.

That is, the DM-RS is configured to be transmitted only on the RB(s) to which the PDSCH is mapped in a subframe where the PDSCH is scheduled, unlike a CRS configured to be transmitted in every subframe irrespective of the presence or absence of the PDSCH. In addition, the DM-RS is transmitted only on an antenna port(s) corresponding to the layer(s) for the PDSCH, unlike a CRS transmitted on all antenna ports regardless of the number of PDSCH layers. Accordingly, RS overhead may decrease compared to the CRS.

In the 3GPP LTE-A system, DM-RSs are defined in a PRB pair. Referring to FIG. 9, for p=7, p=8, or p=7, 8, ..., ν+6, a DM-RS sequence, r(m) is mapped to a complex-valued modulation symbol, $a_{k,l}^{(p)}$ in a PRB with a frequency-domain index of nPRB, which is assigned for PDSCH transmission, according to Equation 1.

$$a_{k,l}^{(p)} = w_p(l') \cdot r(3 \cdot l' \cdot N_{RB}^{max,DL} + 3 \cdot n_{PRB} + m') \quad \text{[Equation 1]}$$

$w_p(j)$, l, and m' are given by Equation 2.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{[Equation 2]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8} \\ l' \bmod 2 + 2 + 3\lfloor l'/2 \rfloor & \text{if in a special subframe with configuration 1, 2, 6, or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in special subframe with configuration 1, 2, 6, or 7} \\ 2, 3 & \text{if } n_s \bmod 2 = 1 \text{ and not in special subframe with configuration 1, 2, 6, or 7} \end{cases}$$

$$m' = 0, 1, 2$$

The length-4 sequence for the normal CP, $\overline{w}_p(i)$, that is, an orthogonal cover code (OCC) is given according to antenna port indices as shown in Table 1 below.

TABLE 1

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, v+6\}$, the DM-RS sequence $r(m)$ is defined as shown in Equation 3.

$$r(m) = \frac{1}{\sqrt{2}}(1 - 2 \cdot c(2m)) + j\frac{1}{\sqrt{2}}(1 - 2 \cdot c(2m+1)), \quad [\text{Equation 3}]$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 3, c(i) is a pseudo-random sequence defined by a length-31 Gold sequence. The output sequence c(n) with a length of MPN, where n=0, 1, ..., MPN−1, is defined by Equation 4.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad [\text{Equation 4}]$$

In Equation 4, NC=1600 and the first m-sequence is initialized with x1(0)=1, x1(n)=0, n=1, 2, ..., 30. In addition, the second m-sequence is denoted by $c_{init} = \sum_{i=0}^{30} x_2(i) \cdot 2^i$ with the value depending on the application of the sequence. In Equation 4, the pseudo-random sequence for generating c(i) is initialized with cinit at the start of each subframe according to Equation 5.

$$c_{init} = (\lfloor n_s/2 \rfloor + 1) \cdot (2N_{ID}^{cell} + 1) \cdot 2^{16} + n_{SCID} \quad [\text{Equation 5}]$$

In Equation 5, the value of nSCID is zero unless specified otherwise. For PDSCH transmission on antenna ports 7 or 8, nSCID is given by DCI format 2B or 2C. DCI format 2B is a DCI format for a PDSCH using a maximum of 2 DM-RS antenna ports. DCI format 2C is a DCI format for a PDSCH using a maximum of 8 DM-RS antenna ports.

Before describing the present disclosure, a method of transmitting DM-RS based DL data signal, that is, a PDSCH will be described in brief. Equation 6 below shows how the DM-RS based DL data signal is transmitted in the prior art.

$$\begin{bmatrix} y^{(7)}(i) \\ y^{(8)}(i) \\ \vdots \\ y^{(6+v)}(i) \end{bmatrix} = \begin{bmatrix} x^{(0)}(i) \\ x^{(1)}(i) \\ \vdots \\ x^{(v-1)}(i) \end{bmatrix} \quad [\text{Equation 6}]$$

In Equation 6, x(i) indicates a data signal where layer mapping is performed, and v indicates the number of layers. Data signals are mapped one-to-one to DM-RS ports, and data and DM-RSs are transmitted to a UE after the same precoding is applied thereto.

First Embodiment

In the first embodiment of the present disclosure, a method of transmitting a DL data signal through linear combination of DM-RS ports will be described. In particular, in the first embodiment of the present disclosure, data is transmitted on an effective channel generated by the linear combination of DM-RS ports.

When the linear combination is performed, a coefficient applied to a specific DM-RS port (hereinafter, such a DM-RS port is referred to as a reference DM-RS port) is set to be relatively large, whereas coefficients applied to other DM-RS ports are set to be relatively small. As a result, the effective channel generated by the linear combination is highly correlated with the channel of the reference DM-RS port and thus fluctuates with respect to the channel of the reference DM-RS port depending on coefficient values. The main object of the first embodiment is to improve a precoder with low accuracy due to inaccurate channel feedback, channel variation depending on time, frequency selectivity of a channel, etc. For example, a PMI, which is fed back, is highly correlated with an actual channel for data transmission (or a dominant eigenvector of the channel), there may be a small difference therebetween due to the inaccurate channel feedback, channel variation depending on time, frequency selectivity of the channel, etc. In this case, the first embodiment may be applied to correct the difference.

Equation 7 shows data to DM-RS mapping according to the first embodiment of the present disclosure.

$$\begin{bmatrix} y^{(7)}(i) \\ y^{(8)}(i) \\ y^{(9)}(i) \\ y^{(10)}(i) \end{bmatrix} = \begin{bmatrix} 1 & \varepsilon_{01}(i) * e^{j\theta_{01}(i)} \\ \varepsilon_{10}(i) * e^{j\theta_{10}(i)} & 1 \\ \varepsilon_{20}(i) * e^{j\theta_{20}(i)} & \varepsilon_{21}(i) * e^{j\theta_{21}(i)} \\ \varepsilon_{30}(i) * e^{j\theta_{30}(i)} & \varepsilon_{31}(i) * e^{j\theta_{31}(i)} \end{bmatrix} \begin{bmatrix} x^{(0)}(i) \\ x^{(1)}(i) \end{bmatrix} \quad [\text{Equation 7}]$$

In Equation 7, x(0)(i) and x(1)(i) indicate first layer data and second layer data transmitted in an i-th time-frequency resource unit (RU), respectively. For example, the RU may be an RE, RB, REG, PRG, or subband. In addition, y(7)(i), y(8)(i), y(9)(i), and y(10)(i) indicate DM-RS ports 7 to 10, respectively. The linear combination coefficient applied to each port (which is less than 1), that is, an epsilon value and a phase value vary for each RU. As a result, the effective channel for data transmission has a different direction for each RU.

According to Equation 7, x(0)(i) is transmitted on port 7 (reference DM-RS port) at a size of 1 and transmitted on ports 8 to 10 with sizes of $\varepsilon_{10}(i)$, $\varepsilon_{20}(i)$, and $\varepsilon_{30}(i)$, respectively. As a result, x(0)(i) is transmitted on an effective channel of H7+$\varepsilon_{10}(i)*e^{j\theta_{10}(i)}$H8+$\varepsilon_{20}(i)*e^{j\theta_{20}(i)}$H9+$\varepsilon_{30}(i)*e^{j\theta_{30}(i)}$H10 (where Hi indicates a channel vector estimated from DM-RS port i). In other words, x(0)(i) is transmitted on the channel obtained by adding $\varepsilon_{10}(i)*e^{j\theta_{10}(i)}$H8+$\varepsilon_{20}(i)*e^{j\theta_{20}(i)}$H9+$\varepsilon_{30}(i)*e^{j\theta_{30}(i)}$H10 to H7.

In $\varepsilon_{10}(i)*e^{j\theta_{10}(i)}$H8+$\varepsilon_{20}(i)*e^{j\theta_{20}(i)}$H9+$\varepsilon_{30}(i)*e^{j\theta_{30}(i)}$H10, since the linear combination coefficient varies for each RU, the effective channel on which x(0)(i) is transmitted also varies slightly for each RU with respect to H7, thereby obtaining diversity gain. In the case of x(1)(i), the same effect can be obtained except that the reference port is changed to port 8.

Although Equation 7 shows that for DL data transmission, rank-2, i.e., two-layer transmission is performed when 4 DM-RS ports (ports 7 to 10) are configured for a UE, the present disclosure is not limited thereto. That is, the disclosure is also applicable when N DM-RS ports are configured and rank-m transmission is performed. Specifically, if only ports 7 and 8 are used, y(9) and y(10) are removed from Equation 7 and the third and fourth rows of the precoding matrix, which consists of linear combination coefficients, are removed. That is, the data to DM-RS mapping may be represented as shown in Equation 8.

$$\begin{bmatrix} y^{(7)}(i) \\ y^{(8)}(i) \end{bmatrix} = \begin{bmatrix} 1 & \varepsilon_{01}(i)*e^{j\theta_{01}(i)} \\ \varepsilon_{10}(i)*e^{j\theta_{10}(i)} & 1 \end{bmatrix} \begin{bmatrix} x^{(0)}(i) \\ x^{(1)}(i) \end{bmatrix} \quad [\text{Equation 8}]$$

When the rank of the precoding matrix is changed, the precoding matrix is composed of as many precoding vectors as the precoding matrix rank. For example, in the case of rank 4, (n, n) elements of the precoding matrix, i.e., diagonal elements are set to 1, and the remaining elements are composed of epsilon and phase values.

The linear combination coefficient may be indicated by a base station to a UE semi-statically through the RRC layer or dynamically through the L1/L2 layer. Alternatively, after predefining candidate linear-combination coefficient sets, the base station may inform the UE which candidate the UE should use. For example, assuming that there are two linear-combination set candidates with different epsilon values, the base station may indicate a candidate with a large epsilon value when the channel variation is high, whereas the base station may indicate a candidate with a small epsilon value when the channel variation is low. That is, the base station may adjust beam diversity depending on channel states.

Although Equation 7 shows that each data layer has a fixed reference port, that is, the first and second layers use as their reference layers ports 7 and 8, respectively, the base station may indicate to the UE a reference port to be used for each data layer.

In addition, although Equation 7 shows the number of ports to which the linear combination is applied is fixed to 4, the base station may indicate to the UE the number of ports on which the linear combination is performed. The base station determines and indicates the number of ports by considering a trade-off between DM-RS overhead, which increases as the number of ports increases, and beam diversity, which increases as the number of ports increases. When the number of DM-RS ports is indicated, a DM-RS table, which is transmitted in DCI and defines the number of data layers, DM-RS sequence information (e.g., sequence seed information such as nSCID, VCID, etc.), needs to be changed. When a small number of DM-RS ports are configured, the maximum number of data layers also decreases since the maximum number of data layers should be less than or equal to the number of DM-RS ports. Thus, the size of payload for indicating one piece of information in the DM-RS table may also decrease.

Reference ports may be cycled on a RU basis. For example, assuming that the RU consists of RBs, the reference ports for layer 1 are determined as follows: port 7 in RB 0, port 8 in RB 1, port 9 in RB 2, and port 10 in RB 3. After circular cycling, the reference ports for layer 1 are determined as follows: port 7 in RB 4, port 8 in RB 5, port 9 in RB 6, and port 10 in RB 7. Similarly, the reference ports for layer 2 may be cycled in the following order: port 8, port 9, port 10, and port 7.

The reference port cycling set may be equal to a set of linearly combined ports. That is, in the first embodiment, a set of linearly combined ports {7, 8, 9, 10} is set to the cycling set. Reference ports may be cycled on a different RU basis from that on which linear combination coefficients are changed. For example, reference ports may be cycled on an RB basis, and linear combination coefficients may be changed on an RE basis. That is, if the RU for cycling reference ports is set to a multiple of the RU for changing linear combination coefficients, small channel diversity is obtained at an effective channel of a reference port using a linear combination coefficient while the reference port is fixed, and in the case of the large RU, large channel diversity is obtained when the reference port is changed. The base station may indicate the RUs to the UE, or the UE determines the RUs and reports the determined RUs to the base station.

As a particular example of Equation 7, Equation 9 shows that the epsilon value is fixed to 0.1 and depending on RU i, the phase value of a linear combination coefficient applied to each port is cycled in the following order: 0°, 90°, 180°, and 270°. In addition, the linear combination is performed in various beam directions by changing the phase offset value of the linear combination coefficient applied to each port.

$$\begin{bmatrix} y^{(7)}(i) \\ y^{(8)}(i) \\ y^{(9)}(i) \\ y^{(10)}(i) \end{bmatrix} = \begin{bmatrix} 1 & 0.1e^{j\pi \mod(i,4)/2} \\ 0.1e^{j\pi \mod(i,4)/2} & 1 \\ 0.1e^{j\pi \mod(i+1,4)/2} & 0.1e^{j\pi \mod(i+1,4)/2} \\ 0.1e^{j\pi \mod(i+2,4)/2} & 0.1e^{j\pi \mod(i+2,4)/2} \end{bmatrix} \begin{bmatrix} x^{(0)}(i) \\ x^{(1)}(i) \end{bmatrix} \quad [\text{Equation 9}]$$

In Equation 7, the columns of the precoding matrix may not be orthogonal to each other depending on linear combination coefficients, and it means that interference occurs between layers for single-user MIMO. Thus, each column needs to be orthogonal to the other, and to this end, Equation 7 may be modified as shown in Equation 10.

$$\begin{bmatrix} y^{(7)}(i) \\ y^{(8)}(i) \\ y^{(9)}(i) \\ y^{(10)}(i) \end{bmatrix} = \begin{bmatrix} 1 & \varepsilon_{01}(i)*e^{j\theta_{01}(i)} \\ \varepsilon_{10}(i)*e^{j\theta_{10}(i)} & -1 \\ \varepsilon_{20}(i)*e^{j\theta_{20}(i)} & \varepsilon_{21}(i)*e^{j\theta_{21}(i)} \\ \varepsilon_{30}(i)*e^{j\theta_{30}(i)} & -\varepsilon_{31}(i)*e^{j\theta_{31}(i)} \end{bmatrix} \begin{bmatrix} x^{(0)}(i) \\ x^{(1)}(i) \end{bmatrix} \quad [\text{Equation 10}]$$

In Equation 10, if the conditions of $\varepsilon_{10}(i)*e^{j\Theta_{10}(i)} = \varepsilon_{01}(i)*e^{j\Theta_{01}(i)}$, $e^{j\Theta_{20}(i)} = e^{j\Theta_{21}(i)}$ 및 $e^{j\Theta_{30}(i)} = e^{j\Theta_{31}(i)}$, and $\varepsilon_{20}(i)\varepsilon_{21}(i) = \varepsilon_{30}(i)\varepsilon_{31}(i)$ are satisfied, each column becomes orthogonal to the other.

By modifying Equation 9 according to Equation 10, data to DM-RS port mapping may be represented as shown in Equation 11.

$$\begin{bmatrix} y^{(7)}(i) \\ y^{(8)}(i) \\ y^{(9)}(i) \\ y^{(10)}(i) \end{bmatrix} = \begin{bmatrix} 1 & 0.1e^{j\pi \mod(i,4)/2} \\ 0.1e^{j\pi \mod(i,4)/2} & -1 \\ 0.1e^{j\pi \mod(i+1,4)/2} & 0.1e^{j\pi \mod(i+1,4)/2} \\ 0.1e^{j\pi \mod(i+2,4)/2} & -0.1e^{j\pi \mod(i+2,4)/2} \end{bmatrix} \begin{bmatrix} x^{(0)}(i) \\ x^{(1)}(i) \end{bmatrix} \quad [\text{Equation 11}]$$

Simply, if DM-RS ports used by individual layers are exclusively configured, inter-layer interference may be cancelled. In other words, data layers are transmitted on different ports. Thus, Equation 7 may be modified as shown in Equation 12.

$$\begin{bmatrix} y^{(7)}(i) \\ y^{(8)}(i) \\ y^{(9)}(i) \\ y^{(10)}(i) \end{bmatrix} = \begin{bmatrix} 1 & 0 \\ 0 & 1 \\ \varepsilon_{20}(i)*e^{j\theta_{20}(i)} & 0 \\ 0 & \varepsilon_{31}(i)*e^{j\theta_{31}(i)} \end{bmatrix} \begin{bmatrix} x^{(0)}(i) \\ x^{(1)}(i) \end{bmatrix} \quad \text{[Equation 12]}$$

It can be seen from Equation 12 that layer 0 is transmitted on ports 7 and 9 and layer 1 is transmitted on port 8 and 10. However, since the number of ports linearly combined for layer transmission is small, diversity gain may decrease.

Second Embodiment

In the second embodiment of the present disclosure, provided is a method by which a UE calculates and reports CSI by assuming DL data is received according to the DM-RS based DL data signal transmission method described in the first embodiment.

First, a beamforming vector for a DM-RS port assumed by a UE for CSI calculation will be described.

1. Beamforming Vector Applied to Reference DM-RS Port

If a UE reports a rank-n PMI (n=2 in the above example), the UE calculates CQI/CSI by assuming that each column vector of the rank-n PMI is used as a beamforming vector for a reference DM-RS port of each of 0-th to (n−1)-th layers.

For example, in the case of n=2, the UE reports a rank-2 PMI and assumes that the first column vector of the rank-2 PMI is used as a beamforming vector for port 7, which is the reference port of layer 0 and the second column vector of the rank-2 PMI is used as a beamforming vector for port 8, which is the reference port of layer 1. When it is said that a specific column vector is used as a beamforming vector for port i, it may mean that when an RS sequence corresponding to port i is transmitted, the column vector is used as the beam forming vector. Consequently, when the UE estimates a channel from port i, the UE may estimate effective channel Hv where transmission beamforming vector v is applied to downlink channel H.

2. Beamforming Vectors Applied to Other Ports Except Reference DM-RS Port

1) A conventional 8-Tx dual codebook is composed of W1 and W2, where W1 indicates a beam set consisting of four beams and W2 is configured to select one of the four beams and generate co-phasing. In this case, CQI/CSI is calculated on the assumption that among vectors included in W1, vectors which are not applied to a reference port are used as beamforming vectors for the remaining ports except the reference port. If the beam set in W1 is composed of highly correlated beams, the linear combination is performed in a state that all ports (reference and remaining ports) have similar beam directions, thereby obtaining diversity in a specific direction. Thus, the present method may be suitable when a UE does not move at high speed or when the Doppler effect is not severe.

2) Alternatively, the CQI/CSI may also be calculated on the assumption that a random vector orthogonal to the beamforming vector applied to the reference port is applied to the remaining ports except the reference port. For example, a random beamforming vector orthogonal to the beamforming vector applied to reference port 7 is applied to the remaining ports (ports 8 to 10) of layer 0 except reference port 7. In this case, the random vector may depend on UE implementation. Preferably, beamforming vectors to be applied to port 7 to 10 may be configured to be orthogonal to each other. In this case, since the linear combination is performed in various beam directions, high beam diversity gain may be obtained.

Figure 10:
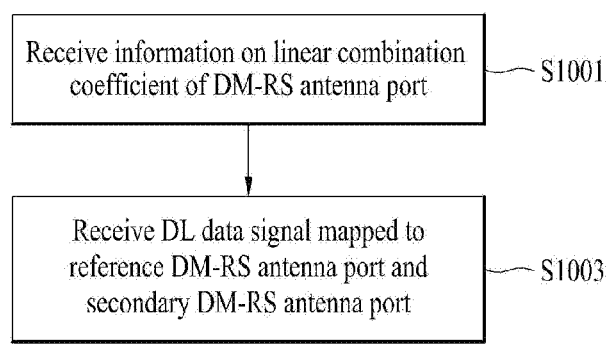
FIG. 10 is a flowchart illustrating how a UE receives a DL data signal according to an embodiment of the present disclosure.

FIG. 10 is a flowchart illustrating how a UE receives a DL data signal according to an embodiment of the present disclosure.

Referring to FIG. 10, in step 1001, the UE receives information on a linear combination coefficient of a DM-RS antenna port from a base station semi-statically through high-layer signaling or dynamically through L1/L2 signaling. The linear combination coefficient includes a first factor for amplitude scaling, which has a value greater than or equal to 0 and less than 1, and a second factor for phase shifting.

Thereafter, in step 1003, the UE receives, from the base station, a DL data signal to which a precoder for mapping to a reference DM-RS antenna port and at least one secondary DM-RS antenna port among a plurality of DM-RS ports is applied. Specifically, the precoder may be configured to map the DL data signal to the reference DM-RS antenna port and map the DL data signal to the at least second DM-RS antenna port by applying the linear combination coefficient. If there are two or more secondary DM-RS antenna ports, linear combination coefficients respectively corresponding to the two or more secondary DM-RS antenna ports may be configured independently from each other.

In particular, the DL data signal may include a first layer signal and a second layer signal as shown in Equations 7 to 12. To obtain transmission diversity gain, diversity transmission is performed such that the layer signals are transmitted on DM-RS antenna ports, respectively. In this case, if a layer signal is transmitted on the reference DM-RS antenna port, the layer signal is transmitted without any changes. However, if a layer signal is transmitted on the secondary DM-RS port, its phase and amplitude are changed. Preferably, a reference DM-RS antenna port and at least one secondary DM-RS antenna port to which the first layer signal is mapped may be different from a reference DM-RS antenna port and at least one secondary DM-RS antenna port to which the secondary layer signal is mapped as shown in Equations 7 to 12.

Figure 11:
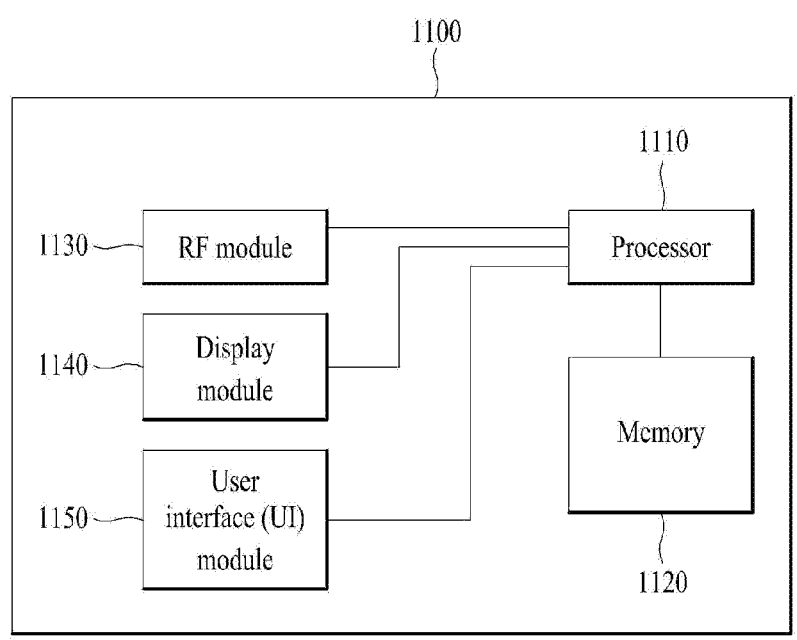
FIG. 11 is a block diagram of a communication apparatus according to an embodiment of the present disclosure.

FIG. 11 is a block diagram of a communication apparatus according to an embodiment of the present disclosure.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present disclosure described with respect to the drawings. For a detailed description of the operation of the processor 1010, reference may be made to the description associated with FIGS. 1 to 10.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present disclosure according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present disclosure. The order of operations to be disclosed in the embodiments of the present disclosure may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present disclosure are implemented by firmware or software, the present disclosure can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of receiving a demodulation-reference signal (DM-RS) based downlink data signal from a base station by a user equipment (UE) in a multi-antenna wireless communication system, the method comprising:
   receiving information on a linear combination coefficient of a DM-RS antenna port from the base station; and
   receiving, from the base station, the downlink data signal to which a precoder is applied for mapping the downlink data signal to reference DM-RS antenna ports and secondary DM-RS antenna ports,
   wherein the precoder is configured to map the downlink data signal to the reference DM-RS antenna ports and to the secondary DM-RS antenna ports by applying the linear combination coefficient, and
   wherein the downlink data signal comprises a first layer signal and a second layer signal, and wherein the first layer signal is mapped to a reference DM-RS antenna port and at least one second DM-RS antenna port and the second layer signal is mapped to a different reference DM-RS antenna port and a different at least one secondary DM-RS antenna port.

2. The method of claim 1, wherein the linear combination coefficient comprises a first factor for amplitude scaling with a value greater than or equal to 0 and less than 1 and a second factor for phase shifting.

3. The method of claim 2, wherein when there are two or more secondary DM-RS antenna ports associated with the first or the second layer signal, linear combination coefficients respectively related to the two or more secondary DM-RS antenna ports are configured independently from each other.

4. The method of claim 1, wherein the reference DM-RS antenna ports are changed such that they are cyclically repeated on a predetermined time-frequency resource unit basis.

5. A user equipment (UE) in a wireless communication system, the UE comprising:
   a transmitter and a receiver; and
   a processor connected to the transmitter and receiver,
   wherein the processor is configured to receive information on a linear combination coefficient of a demodulation-reference signal (DM-RS) antenna port from a base station and receive a downlink data signal to which a precoder is applied for mapping the downlink data signal to reference DM-RS antenna ports and secondary DM-RS antenna, and
   wherein the precoder is configured to map the downlink data signal to the reference DM-RS antenna ports and to the secondary DM-RS antenna ports by applying the linear combination coefficient, and
   wherein the downlink data signal comprises a first layer signal and a second layer signal, and wherein the first layer signal is mapped to a reference DM-RS antenna port and at least one second DM-RS antenna port and the second layer signal is mapped to a different reference DM-RS antenna port and a different at least one secondary DM-RS antenna port.

6. The UE of claim 5, wherein the linear combination coefficient comprises a first factor with a value greater than or equal to 0 and less than 1 and a second factor for phase shifting.

7. The UE of claim 6, wherein when there are two or more secondary DM-RS antenna ports associated with the first or the second layer signal, linear combination coefficients respectively related to the two or more secondary DM-RS antenna ports are configured independently from each other.

8. The UE of claim 5, wherein the reference DM-RS antenna ports are changed such that they are cyclically repeated on a predetermined time-frequency resource unit basis.

* * * * *